United States Patent
Schötzau et al.

(10) Patent No.: US 11,504,680 B2
(45) Date of Patent: Nov. 22, 2022

(54) DOUBLE-BLADED WORM SHAFT FOR A MIXING AND KNEADING MACHINE, WHEREIN EACH OF THE BLADE ELEMENTS HAS AN ELLIPTIC, OVAL, OR BIOCONVEX OUTER PERIPHERAL SURFACE IN THE TOP VIEW

(71) Applicant: BUSS AG, Pratteln (CH)

(72) Inventors: Martin Schötzau, Augst (CH); Wolfgang Walter, Aalen (DE)

(73) Assignee: BUSS AG, Prattein (CH)

( * ) Notice: Subject to any disclaimer, the term of this patent is extended or adjusted under 35 U.S.C. 154(b) by 15 days.

(21) Appl. No.: 16/756,665

(22) PCT Filed: Oct. 2, 2018

(86) PCT No.: PCT/EP2018/076880
§ 371 (c)(1),
(2) Date: Apr. 16, 2020

(87) PCT Pub. No.: WO2019/076631
PCT Pub. Date: Apr. 25, 2019

(65) Prior Publication Data
US 2020/0282598 A1   Sep. 10, 2020

(30) Foreign Application Priority Data

Oct. 17, 2017  (EP) ..................................... 17196908
Jan. 19, 2018  (EP) ..................................... 18152448
Apr. 30, 2018  (EP) ..................................... 18170206

(51) Int. Cl.
*B01F 27/724*   (2022.01)
*B29C 48/45*    (2019.01)
(Continued)

(52) U.S. Cl.
CPC ........ *B01F 27/724* (2022.01); *B01F 27/1143* (2022.01); *B29B 7/421* (2013.01);
(Continued)

(58) Field of Classification Search
CPC .................. B01F 7/086; B01F 7/00416; B01F 2215/0049; B01F 2215/0422; B29C 48/45;
(Continued)

(56) References Cited

U.S. PATENT DOCUMENTS 3,169,752 A * 2/1965 Laubarede .............. B29C 48/68
366/80
3,347,528 A * 10/1967 Rouner ................... B29C 48/92
366/75
(Continued)

FOREIGN PATENT DOCUMENTS

| CA | 1016316 A | 8/1977 |
| CH | 278575 A | 10/1951 |

(Continued)

OTHER PUBLICATIONS

International Search Report for corresponding PCT Application No. PCT/EP2018/076880 dated Nov. 26, 2018.
(Continued)

*Primary Examiner* — Charles Cooley
(74) *Attorney, Agent, or Firm* — Wood, Phillips, Katz, Clark & Mortimer

(57) ABSTRACT

A worm shaft for a mixing and kneading machine particularly for continual processing having a shaft bar, on the circumferential surface of which blade elements are arranged to be spaced apart from one another extending outwards from the circumferential surface of the shaft bar, wherein the blade elements are arranged on the circumferential surface of the shaft bar, at least in one section
(Continued)

extending in the axial direction of the worm shaft, in two rows extending in the axial direction of the worm shaft, and wherein each of the blade elements of the at least one section extending in the axial direction of the worm shaft has an elliptic, oval, or biconvex outer peripheral surface in the top view.

15 Claims, 5 Drawing Sheets

(51) Int. Cl.
- B29C 48/565 (2019.01)
- B29C 48/685 (2019.01)
- B29B 7/42 (2006.01)
- B01F 27/1143 (2022.01)
- B01F 101/00 (2022.01)

(52) U.S. Cl.
CPC .............. *B29B 7/423* (2013.01); *B29B 7/429* (2013.01); *B29C 48/45* (2019.02); *B29C 48/565* (2019.02); *B29C 48/687* (2019.02); *B01F 2101/2805* (2022.01); *B01F 2215/0422* (2013.01)

(58) Field of Classification Search
CPC ..... B29C 48/565; B29C 48/687; B29B 7/421; B29B 7/423; B29B 7/429; B29B 7/428; B29B 7/523; B29B 7/422; B29B 7/425; B29B 7/426
USPC ...................................................... 366/80–81
See application file for complete search history.

(56) References Cited

U.S. PATENT DOCUMENTS

| | | | | |
|---|---|---|---|---|
| 3,458,894 A | * | 8/1969 | Wheeler | B29C 48/395 366/78 |
| 3,618,903 A | | 11/1971 | Ronner et al. | |
| 3,938,783 A | | 2/1976 | Porter | |
| 3,981,658 A | * | 9/1976 | Briggs | B29B 7/429 425/205 |
| 4,025,274 A | | 5/1977 | Uemura et al. | |
| 4,199,263 A | * | 4/1980 | Menges | B30B 11/248 366/90 |
| 4,304,054 A | * | 12/1981 | Nauck | F26B 5/14 34/183 |
| 4,538,917 A | | 9/1985 | Harms | |
| 4,629,327 A | * | 12/1986 | Capel | B29C 48/92 366/80 |
| 5,302,019 A | | 4/1994 | Henschel et al. | |
| 5,932,159 A | | 8/1999 | Rauwendaal | |
| 6,062,718 A | | 5/2000 | Fogarty | |
| 6,152,592 A | * | 11/2000 | Klein | B29C 48/362 366/80 |
| 6,250,791 B1 | | 6/2001 | Schneider | |
| 6,547,431 B1 | * | 4/2003 | Womer | B29C 48/505 366/81 |
| 7,909,500 B2 | | 3/2011 | Grutter et al. | |
| 9,168,676 B2 | * | 10/2015 | Siegenthaler | B29B 7/423 |
| D957,180 S | * | 7/2022 | Walter | D7/376 |
| 11,376,760 B2 | * | 7/2022 | Takeuchi | B29B 7/421 |
| 2007/0183253 A1 | * | 8/2007 | Siegenthaler | B29B 7/423 366/80 |
| 2010/0284236 A1 | * | 11/2010 | Franz | B29C 48/04 366/75 |
| 2020/0238235 A1 | * | 7/2020 | Schotzau | B29B 7/421 |
| 2021/0229336 A1 | * | 7/2021 | Walter | B29B 7/489 |

FOREIGN PATENT DOCUMENTS

| | | | |
|---|---|---|---|
| CH | 464656 A | | 10/1968 |
| CH | 695934 A5 | | 10/2006 |
| CH | 701030 A2 | | 11/2010 |
| CN | 101069825 A | | 11/2007 |
| CN | 202318878 U | | 7/2012 |
| CN | 103057088 A | | 4/2013 |
| DE | 2235784 A1 | | 1/1974 |
| DE | 2307616 A1 | | 9/1974 |
| DE | 3132429 A1 | | 2/1983 |
| DE | 4141328 C1 | | 2/1993 |
| DE | 69212748 T2 | | 1/1997 |
| DE | 60100970 T2 | | 7/2004 |
| EP | 82494 A1 | | 6/1983 |
| EP | 0140846 A2 | | 5/1985 |
| EP | 1247454 A1 | | 10/2002 |
| EP | 1815958 A1 | | 8/2007 |
| EP | 2018946 A2 | | 1/2009 |
| EP | 3473404 A1 | * | 4/2019 |
| GB | 1512316 A | | 6/1978 |
| JP | 2014091320 A | * | 5/2014 ............. B29B 7/421 |
| WO | 9924236 A1 | | 5/1999 |
| WO | WO-2012156263 A1 | * | 11/2012 ............. B29B 7/422 |

OTHER PUBLICATIONS

Office Action for corresponding Indian Application No. 202047019869 dated Mar. 7, 2022.

\* cited by examiner

DOUBLE-BLADED WORM SHAFT FOR A MIXING AND KNEADING MACHINE, WHEREIN EACH OF THE BLADE ELEMENTS HAS AN ELLIPTIC, OVAL, OR BIOCONVEX OUTER PERIPHERAL SURFACE IN THE TOP VIEW

BACKGROUND OF THE INVENTION

The present invention relates to a worm shaft for a mixing and kneading machine particularly for continual processing, a corresponding worm shaft section, a housing comprising such a worm shaft or such a worm shaft section and a mixing and kneading machine for continual processing comprising such a housing.

Such mixing and kneading machines with such worm shafts are used particularly for the preparation of malleable and/or paste-like masses. For example, they are used for the preparation of viscoplastic masses, for the homogenisation and plasticisation of plastics, rubber, and the like, the incorporating of filling and reinforcing materials, and the manufacture of raw materials for the food industry. The worm shaft hereby forms the working element, which transports or conveys the material to be processed forwards in the axial direction and thereby mixes the components of the material together.

Such mixing and kneading machines are particularly suitable for the manufacture of polymer granulate, polymer extrusion profiles, polymer moulded parts, and the like. In the mixing and kneading machine, a homogeneous polymer melt is thereby produced, which is then for example conveyed into a delivery device and from this to, for example, a granulating device, a shaft, a conveyor belt or the like.

Such mixing and kneading machines are for example known from CH 278 575 A and CH 464 656.

In these mixing and kneading machines, the worm shaft preferably does not only perform a rotary movement, but also moves at the same time in the axial direction, i.e., in the longitudinal direction of the worm shaft, translationally back and forth. The movement sequence is therefore characterised preferably in that the worm shaft—as seen in the axial direction—performs an oscillating movement being superimposed over the rotation. This movement sequence enables the introduction of fittings, namely kneading elements, such as kneading bolts, or kneading cogs, into the housing of the mixing and kneading machine. Due to the presence of the kneading elements, the worm being arranged on the main shaft, what is termed the shaft bar, does not—as seen in the cross-section of the shaft bar—run continuously, but is subdivided into a multitude of individual blade elements which extend respectively over a calculated angular section of the cross-sectional circumference of the shaft bar. Neighbouring blade elements are spaced apart from one another both in the axial direction and in the outer peripheral direction of the shaft bar, i.e., a gap is provided respectively in both the axial direction and in the outer peripheral direction of the shaft bar between neighbouring blade elements. If, for example, the entire shaft bar of the worm shaft or an axial section of the shaft bar of the worm shaft, as seen in the cross-section of the shaft bar, comprises three blade elements which each extend over an angular section of, for example, 100° of the cross-sectional circumference of the shaft bar, this is described as a three-bladed worm shaft or a three-bladed worm shaft section if this blade element arrangement does not extend over the entire axial length of the shaft bar but rather only over a section thereof. The rotation and the translatory movement of the worm shaft in the axial direction are controlled such that the individual blade elements during the rotation and translatory movement come close with the flanks thereof to the corresponding kneading elements in order to condense the material being mixed and kneaded, and to exert a shearing action thereon in order to facilitate the mixing and/or kneading process without the kneading elements colliding with the blade elements. Furthermore, because they get close to the flanks of the blade elements during the rotation and translatory movement of the worm shaft, the kneading elements prevent the deposition of components of the mixture forming on the flanks of the blade elements such that the kneading elements also effect a cleaning of the blade elements as a result. The number and geometry of the blade elements must naturally be adapted to the number of kneading elements. Usually, the individual kneading elements are arranged on the inner peripheral surface of the housing of the mixing and kneading machine—in the axial direction—in several rows of axially spaced kneading elements, said rows being coordinated to the geometry and number of the blade elements and extending over at least one axial section of the inner peripheral surface of the housing. If, for example, four axially extending rows of kneading elements are arranged on the inner peripheral surface of the housing, the worm shaft can have on the outer peripheral surface thereof, for example—as seen in the cross-section—four blade elements, between which a sufficiently wide distance is respectively provided so that the kneading elements can move through these gaps during the rotation and axial movement of the worm shaft.

The described mixing and kneading machines are frequently subdivided into various process segments in the axial direction, wherein each process segment is occupied with a corresponding number or geometry of blade elements and kneading elements depending on the task allocated thereto during operation. For example, depending on the material to be mixed, a mixing and kneading machine comprises in the axial direction a feed-in section positioned at the upstream end in which the components being mixed or kneaded are introduced into the machine, a melting section being connected downstream therefrom in which the components are melted, a mixing and dispersing section in which any aggregate of the components of the material are crushed and mixed as homogeneously as possible with one another, and a degassing section in which the mixture is degassed. It has already been proposed that a different number of kneading elements and thereto adapted other blade elements be provided in individual process sections of the mixing and kneading machine than in other sections, in order to adjust the conditions in the individual process sections to the requirements of the different process sections. For example, it is known to arrange the worm shaft of a mixing and kneading machine in some sections with three blades and in some sections with four blades, and to accordingly equip the corresponding process sections of the housing interior wall of the mixing and kneading machine with three or four rows of kneading elements. This can be realised in that the housing is subdivided into several housing shells of which some have three rows of kneading elements and others have four rows of kneading elements.

However, the previously known mixing and kneading machines of the aforementioned type in which is provided, for example, a three-bladed worm shaft, a four-bladed worm shaft or a worm shaft which is designed in some sections as three-bladed and in some sections as four-bladed, has the disadvantage that these require one or more of what are termed retaining rings in order to ensure an effective plasticisation of the conveyed material in the conveying direction of the worm shaft.

This is because unplasticised material can otherwise pass through the mixing and kneading machine in the case of materials that are difficult to plasticise. A retaining ring is a sinusoidal projection on the inner peripheral surface of the housing which leads to a narrowing in some sections of the hollow interior being formed by the housing interior wall. Consequently, a retaining ring is a chicane extending from the inner peripheral surface of the housing through a small axial section, radially into the hollow interior, which in the hollow interior sets up a suitable backlog until the material is plasticised far enough to be able to pass the chicane. However, no blade elements and no kneading elements can be arranged at the location of the retaining rings, as these would collide there, which is why at these locations, deposits gather easily which can only be removed with difficulty from the mixing and kneading machine due to the lack of self-cleaning.

SUMMARY OF THE INVENTION

For this reason, the object of the present invention is to overcome the aforementioned disadvantages and to provide a worm shaft for a mixing and kneading machine, which makes it possible to avoid the requirement of wear-prone retaining rings in the housing of the mixing and kneading machine.

According to the invention, this object is achieved by a worm shaft for a mixing and kneading machine particularly for continual processing having a shaft bar, on the circumferential surface of which blade elements are arranged to be spaced apart from one another extending outwards from the circumferential surface of the shaft bar, wherein the blade elements are arranged on the circumferential surface of the shaft bar at least in one section extending in the axial direction of the worm shaft in two rows extending in the axial direction of the worm shaft.

This solution is based on the knowledge that both the wear resistance of the blade elements and the quantity of mixture being conveyable in the longitudinal direction—per time unit and in relation to the worm shaft diameter—can be increased, if the worm shaft is designed to be two-bladed at least in some sections in place of the retaining rings. This is because with a two-bladed worm shaft section the forwards transport is achieved by means of the stroke of the mixing and kneading machine, whereas a retaining ring always causes a backlog, i.e., the conveying effect is practically zero. Due to the width of the blade elements, these are less wear-prone than a retaining ring or blade elements of three-bladed or four-bladed worm shaft sections. Finally, two-bladed worm shaft sections with the relevant blade element design make it possible to avoid the use of retaining rings on the inner peripheral surface of the housing, because the correspondingly designed blade elements perform the plasticisation of the mixture in conjunction with the kneading elements attached in the housing, and are also considerably gentler for the mixture than retaining rings.

According to the invention, the worm shaft has outwardly extending blade elements on the circumferential surface of the shaft bar, which are arranged on the circumferential surface of the shaft bar, at least in one section extending in the axial direction of the worm shaft, in two rows extending in the axial direction of the worm shaft. Consequently, the present invention relates to a worm shaft, which is designed to be two-bladed at least in some sections, i.e., a worm shaft, the circumferential surface of which, i.e., the shell surface thereof, as seen in the cross-section of the shaft bar, comprises two blade elements, wherein in the axial direction of the worm shaft neighbouring, spaced apart blade elements each form a row. This two-bladed section comprises—apart from the blade elements being arranged in the two rows—no further blade elements, i.e., no individual blade elements being arranged between these rows. Thus, by a row of kneading elements extending in the axial direction of the worm shaft over at least one section of the (outer) circumferential surface of the shaft bar, it is understood in the sense of the present invention that a connecting line being positioned over the centre points of the blade elements of a row, said blade elements being spaced apart from one another in the axial direction, is at least substantially a straight line, wherein the maximum deviation of the connecting line from a straight line is less than 10°, preferably less than 5° and further preferably less than 2°. Centre point of a blade element is thereby understood to mean the point which is positioned in the centre of the length of the blade element, wherein the length is the longest extension or longitudinal extension of the outer peripheral surface of the blade element, i.e., the longest possible straight line between two different points on the outer peripheral surface of the blade element.

As stated above, the blade elements are arranged in two rows on the circumferential surface of the shaft bar at least in one section extending in the axial direction of the worm shaft. The other axial sections of the worm shaft can be designed differently, namely for example to be three-bladed, four-bladed, or alternately three-bladed and four-bladed. The worm shaft according to the present invention can also comprise two, three or a number of two-bladed sections which are each separated from one another by one or a number of other sections, wherein this one or a number of other sections can in turn be designed to be three-bladed, four-bladed, or alternately three-bladed and four-bladed.

As is usual in terms of the mixing and kneading machines in question, the shaft bar of the worm shaft according to the invention preferably has a circular cross-section, wherein the individual blade elements extend radially outwards from the circumferential surface of the shaft bar.

The present invention is thereby not limited to the type of production of the worm shaft. For example, the worm shaft can be produced by means of milling a metallic cylinder to form the blade elements or by means of welding the blade elements onto a shaft bar. In practical terms, the worm shaft however is produced by attaching individual worm shaft sections onto a base rod, wherein each worm shaft section comprises, for example, two rows made respectively of 1 to 4 neighbouring blade elements.

Preferably, the blade elements of the two rows extending in the radial direction of the worm shaft are positioned opposite the blade elements on the circumferential surface of the shaft bar—as seen in the cross-section of the shaft bar. By positioned opposite, it is hereby understood that the centre points of the two neighbouring blade elements in the circumferential direction of the shaft bar are offset on the circumferential surface of the shaft bar by 180°. In addition, the opposing blade elements, as shown below, are preferably also offset in the axial direction.

To produce a good conveying of the mixture to be conveyed in the conveying direction, it is also preferable that each of the blade elements of the at least one two-bladed section extending in the axial direction of the worm shaft has a longitudinal extension, which extends at least substantially perpendicularly to the longitudinal direction of the worm shaft, i.e., parallel to the circumferential direction of the worm shaft. An at least substantially perpendicular extension in the longitudinal direction of the worm shaft is taken to mean that the longitudinal extensions of the blade elements extend at an angle of 45° to 135°, preferably 60° to 120°, particularly preferably 80° to 100°, very particularly preferably from 85° to 95° and most preferably of about 90° to the axial direction of the worm shaft.

In view of the achieved conveying output of the mixture to be conveyed—per time unit and in relation to the worm shaft diameter—the wear resistance of the blade elements, and the achievement of a desired plasticisation, it is proposed in a further development of the inventive concept that each of the blade elements of the at least one two-bladed section extending in the axial direction of the worm shaft has an outer peripheral surface being elliptical, oval, or biconvex in the top view. Preferably, in this embodiment of the present invention, the at least one two-bladed section of the worm shaft extends over at least 0.2 D (i.e., at least over a distance corresponding to 20% of the diameter), preferably at least 0.5 D (i.e., at least over a distance corresponding to 50% of the diameter), particularly preferably at least 1 D (i.e., at least over a distance corresponding to the diameter) and very particularly preferably at least 10 D (i.e., at least over a distance corresponding to 10 times the diameter) of the length of the worm shaft. Particularly in this embodiment of the present invention, it is preferable that the longitudinal extensions of the blade elements extend at least substantially perpendicularly to the longitudinal direction of the worm shaft, wherein substantially perpendicularly is as defined above. Alternatively thereto, even when less preferable, not all, but at least 50%, preferably at least 80% and further preferably at least 90% of all blade elements can have an outer peripheral surface thus formed.

Preferably, the worm shaft according to the present invention is designed symmetrically in relation to the blade elements. By this, it is understood that the blade elements of the two rows of blade elements extending in the axial direction of the worm shaft are positioned opposite one another and also the blade elements are at least substantially identical in terms of their geometry and dimensions, i.e., that their dimensions differ by a maximum of 10%, preferably by a maximum of 5%, particularly preferably by a maximum of 2%, more particularly preferably by a maximum of 1%, very particularly preferably by a maximum of 0.5% and most preferably not at all. Therefore, it is preferable that each of the blade elements of the at least one two-bladed section of the worm shaft has the same elliptical, oval or biconvex outer peripheral surface. Alternatively thereto, even when less preferable, not all, but at least 50%, preferably at least 80% and further preferably at least 90% of all blade elements can be designed symmetrically.

Good results are achieved particularly if each of the blade elements of the at least one two-bladed section of the worm shaft has a biconvex outer peripheral surface, wherein the biconvex outer peripheral surface particularly preferably has a ratio of length L to width B of 3 to 11. Thereby, the length L of the outer peripheral surface of a blade element in this context, as shown above, is the longest straight extension of the outer peripheral surface of the blade element. In addition, the width B of the outer peripheral surface of a blade element in this context is the longest straight extension of the outer peripheral surface of the blade element, which extends perpendicularly to the length of the blade element. In a further development of the inventive concept, it is proposed that the ratio of length L to width B of the outer peripheral surface of the blade elements of the at least one two-bladed section of the worm shaft is 4 to 10, particularly preferably 5 to 9, very particularly preferably 6 to 8 and most preferably 7 to 7.5. Alternatively thereto, even when less preferable, not all, but at least 50%, preferably at least 80%, and further preferably at least 90% of all blade elements can have the aforementioned geometry.

In principle, the present invention is not limited in terms of the design of the flanks of the blade elements of the at least one two-bladed section of the worm shaft. The lateral flanks of the blade elements can therefore extend perpendicularly upwards from the circumferential direction of the shaft bar to the outer peripheral surface of the blade elements. However, in view of an improved conveying capacity—per time unit and in relation to the worm shaft diameter—in terms of the quantity of mixture conveyed in the longitudinal direction, it is preferable that the lateral flanks of the blade elements do not extend perpendicularly upwards from the circumferential direction of the shaft bar to the outer peripheral surface of the blade elements, but rather are angled. According to a particularly preferable embodiment of the present invention, it is therefore provided that the lateral flanks of each of the blade elements of the at least one two-bladed section of the worm shaft extend upwards to the outer peripheral surface of the blade elements at an angle α of 1° to 60°, preferably of 2° to 40°, particularly preferably of 3° to 20°, and very particularly preferably of 4° to 10° in relation to the cross-sectional plane of the shaft bar. Alternatively thereto, even when less preferable, not all, but at least 50%, preferably at least 80% and further preferably at least 90% of all blade elements can have flanks, which extend upwards from the circumferential surface of the shaft bar at the aforementioned angle.

Both in terms of the wear resistance of the blade elements and in view of the conveying capacity, it is proposed in a further development of the inventive concept that the ratio of the axial distance A of two neighbouring blade elements of a row to the width B of a blade element is 0.5 to 7. The width B of the blade element is thereby defined as above and the axial distance A of two axially neighbouring blade elements is the distance between the centre points of the outer peripheral surfaces of the axially neighbouring blade elements, wherein the centre point of the outer peripheral surface of a blade element is defined as above. Preferably, the ratio of the axial distance B of two neighbouring blade elements of a row to the width B of a blade element is 0.75 to 3, particularly preferably 1.0 to 2.0, very particularly preferably 1.25 to 1.75, and most preferably 1.4 to 1.6. Alternatively thereto, even when less preferable, not all, but at least 50%, preferably at least 90%, and further preferably at least 80% of all blade elements can have the aforementioned ratio.

According to a further very particularly preferable embodiment of the present invention, it is provided that each of the blade elements of the at least one two-bladed section of the worm shaft—as seen in the cross-section of the shaft bar—extends over an angular distance of at least 160° of the circumferential surface of the shaft bar. Particularly preferably, each of the blade elements extends over an angular distance of at least 170°, particularly preferably of at least 175°, even further preferably of at least or more than 180°, even further preferably of more than 180° to 270°, even further preferably of 185° to 230°, particularly preferably of 185° to 210°, very particularly preferably of 190° to 200°, and most preferably of 192° to 197°, such as particularly of about 195°, of the circumferential surface of the shaft bar. Preferably, in this embodiment of the present invention, the at least one two-bladed section of the worm shaft extends over at least 0.2 D, preferably at least 0.5 D, particularly preferably at least 1 D, and very particularly preferably at least 10 D of the length of the worm shaft. Also in this embodiment of the present invention, it is particularly preferable that the longitudinal extensions of the blade elements extend substantially perpendicularly to the longitudinal direction of the worm shaft, wherein substantially perpendicularly is as defined above. Alternatively thereto, even when less preferable, not all, but at least 50%, preferably at least 80%, and further preferably at least 90% of all blade elements can extend over the aforementioned angular distance of the shaft bar.

In the above embodiment, it is very particularly preferably that all blade elements extend over at least substantially the same angular section of the circumferential surface of the shaft bar, and preferably the blade elements of the rows extending in the radial direction of the worm shaft are positioned opposite on the circumferential surface of the shaft bar—as seen in the cross-section of the shaft bar. By at least substantially identical angular section, it is understood in this context that all angular sections differ by a maximum of 10%, preferably by a maximum of 5%, particularly preferably by a maximum of 2%, more particularly preferably by a maximum of 1%, very particularly preferably by a maximum of 0.5%, and most preferably not at all. In this embodiment, the ends of the blade elements neighbouring in the circumferential direction of the shaft bar thus preferably overlap. For this reason, it is particularly preferable in this embodiment that the two blade elements seen in the cross-section of the shaft bar as being neighbouring in the circumferential direction of the shaft bar are slightly displaced with respect to one another in the axial direction, and preferably such that the two ends of the blade elements being positioned in the circumferential direction are axially offset, but areas of these two blade elements, such as the right third of the one blade element and the left third of the other blade element, overlap, as seen in the circumferential direction of the shaft bar. Preferably, the two blade elements being neighbouring in the circumferential direction of the shaft bar as seen in the cross-section of the shaft bar are axially offset to one another such that the ratio of the axial distance A of the two blade elements being neighbouring in the circumferential direction of the shaft bar to the width B of a blade element is 0.25 to 3.5, preferably 0.375 to 1.5, particularly preferably 0.5 to 1.0, very particularly preferably 0.625 to 0.875, and most preferably 0.7 to 0.8. Alternatively thereto, even when less preferable, not all, but at least 50%, preferably at least 90%, and further preferably at least 80% of all blade elements can have the aforementioned ratio. Thereby, in that the blade elements extend over the same angular section of the circumferential surface of the shaft bar and that the blade elements of the two rows of blade elements extending in the axial direction of the worm shaft are opposite one another and overlap, not only is an excellent conveying capacity achieved in relation to the quantity of conveyed mixture in the conveying direction—per time unit and in relation to the worm shaft diameter—, but also a backflow of part of the mixture being conveyed against the conveying direction is particularly reliably avoided or at least drastically reduced. Thereby, in the interior of the housing in which the worm shaft is arranged, a suitable plasticisation is adjusted such that retaining rings can be omitted on the inner peripheral surface of the housing, as is necessary in the prior art, without any undesirable deposits gathering on the worm shaft or on the retaining ring and particularly on the leeside of the retaining ring.

Alternatively to the aforementioned embodiment, even when less preferable according to the present invention as the aforementioned advantages are at least not achieved in this scope, it is however also possible that each of the blade elements of the at least one two-bladed section of the worm shaft—as seen in the cross-section of the shaft bar—extends over an angular distance of 20° to 160° of the circumferential surface of the shaft bar. Alternatively thereto, the blade elements can also extend over an angular distance of 45° to 135°, of 60° to 120°, of 70° to 110°, of 80° to 100°, or of 85° to 95°, such as for example about 90°. Also in this embodiment, the at least one two-bladed section of the worm shaft extends over at least 0.2 D, preferably at least 0.5 D, particularly preferably at least 1 D, and very particularly preferably at least 10 D of the length of the worm shaft. Also in this embodiment of the present invention, it is particularly preferable that the longitudinal extensions of the blade elements extend substantially perpendicularly to the longitudinal direction of the worm shaft, wherein substantially perpendicularly is as defined above.

A further object of the present invention is a section for a worm shaft or a worm shaft section with a shaft bar having a preferably circular cross-section, wherein elements extending outwardly from the circumferential surface of the shaft bar are arranged to be spaced apart from one another on the circumferential surface of the shaft bar blade, wherein the blade elements on the shaft bar are arranged in at least two rows extending in the axial direction of the worm shaft over at least one section of the circumferential surface of the shaft bar, wherein each row comprises preferably one, two, three, or four blade elements arranged axially to be spaced apart from one another. The characteristics described as preferable above in relation to the worm shaft are also preferable for the worm shaft section.

Furthermore, the present invention relates to a housing of a mixing and kneading machine for continual processing, wherein in the housing a hollow interior is designed in which a previously described worm shaft or one or more previously described worm shaft sections extend in the axial direction at least in some sections, and wherein in the housing a number of kneading elements is provided which extend from the inner peripheral surface of the housing into the hollow interior of the housing, wherein the kneading elements are arranged in at least two rows extending in the axial direction over at least one section of the inner peripheral surface of the housing. The section of the housing in which the kneading elements are arranged in at least two rows extending in the axial direction corresponds preferably to the section in which the blade elements are arranged in two rows on the worm shaft.

In addition, the present invention relates to a mixing and kneading machine for continual processing, such as for the production of polymer granulate, polymer extrusion profiles, or polymer moulded parts, having a feed-in and mixing device and preferably having a discharge device, wherein the feed-in and mixing device comprises a previously described housing.

The housing of the mixing and kneading machine preferably has on the inner peripheral surface thereof at least in some sections two rows of kneading elements which are opposite one another, as seen in the cross-section of the housing, i.e., offset by an angle of 180°.

BRIEF DESCRIPTION OF THE DRAWINGS

Below, the present invention is described in more detail with reference to the drawing, in which:

FIG. 1b shows a perspective view of the housing of the mixing and kneading machine shown in FIG. 1a;

FIG. 2b shows a top view of the axial section of the worm shaft shown in FIG. 2a;

DETAILED DESCRIPTION OF THE INVENTION

Figure 1A:
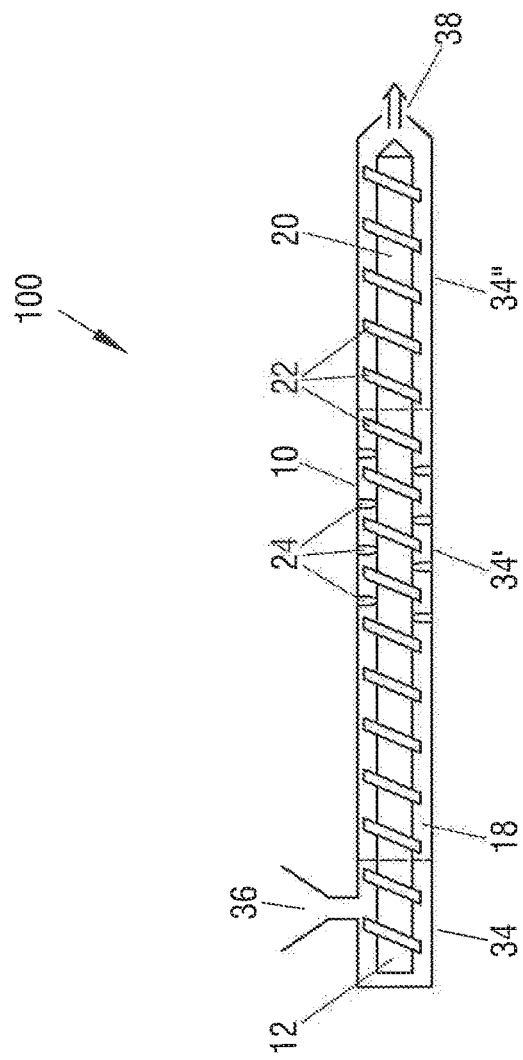
FIG. 1a shows a schematic longitudinal section of a mixing and kneading machine according to the invention.
Figure 1B:
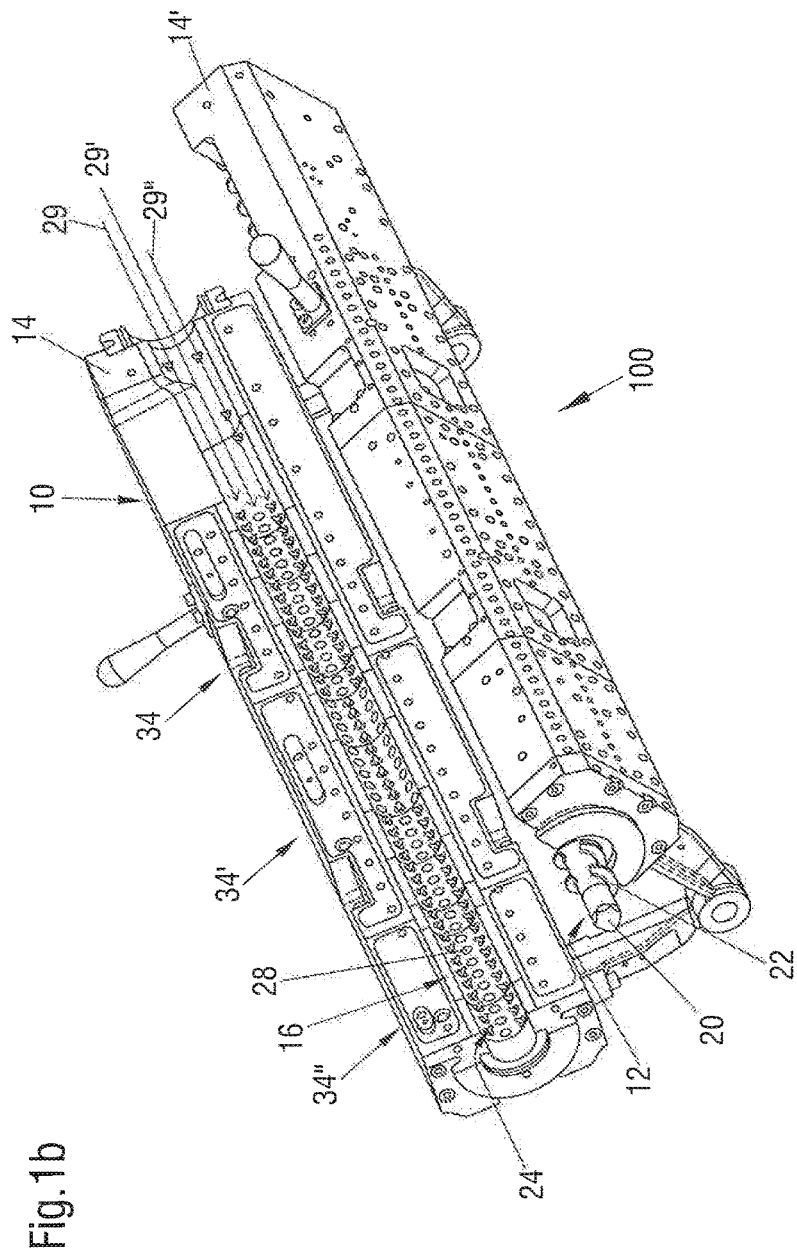

The mixing and kneading machine shown in FIGS. 1a and 1b and labelled with 100 throughout comprises a housing 10 and a worm shaft 12 arranged in the housing 10. The housing 10 comprises two housing halves 14, 14' which are clad inside with what is termed a housing shell 16. In the present patent application, the housing shell 16 is deemed to be a component of the housing 10. When the two housing halves 14, 14' are closed, the inner peripheral surface of the housing 10 limits a cylindrically hollow interior 18, i.e., an interior 18 with a circular cross-section. The worm shaft 12 comprises a shaft bar 20, on the circumferential surface of which blade elements 22 are arranged, which extend radially outwards to the circumferential surface of the shaft bar 20, wherein the individual blade elements 22 are arranged to be spaced apart from one another. In the two housing halves 14, 14', receptacles 28 are provided for kneading element 24, i.e., for kneading bolts, kneading cogs, and the like. Thus, each of the receptacles 28 is a bore 28 which extends from the inner peripheral surface of the housing shell 16 through the housing wall. The lower, radially inward end of each receptacle 28 can, for example, be designed to be square in the cross-section. Each kneading bolt 24 can then, for example, have on the lower end thereof an end fitting exactly into the square, radially inward ends of the receptacles 28 and is thereby fixed non-rotatably into the receptacle 28 in the used state. The kneading bolt 24 is connected on the end thereof positioned in the receptacle 28 with a fixing element (not shown) used in the overlying end of the receptacle 28 by means of screwing. Alternatively, the kneading bolt 24 can also have an internal thread for a screw and be fixed with a screw instead of using the fixing element and the nut.

As can be seen particularly from FIG. 1b, the mutually evenly spaced apart receptacles 28 for the kneading bolts 24 extend into each of the two housing halves 14, 14', as seen in the axial direction, in the form of three rows 29, 29', 29''. The total number of rows of receptacles 29, 29', 29'' of the housing is therefore six. In the sense of the present invention, row is taken to mean that a connecting line positioned over the axially spaced receptacles 28 of a row 29, 29', 29'' is a straight line. As is shown in FIGS. 1a and 1b, the mixing and kneading machine 100 is subdivided in the axial direction into several process sections 34, 34', 34'', wherein each process section 34, 34', 34'' is adapted to the function of the individual process sections 34, 34', 34' in terms of the number of the kneading bolts 24 and the number and extension of the blade elements 22 on the shaft bar 20. As is shown in FIG. 1b, of the three rows 29, 29', 29'' of receptacles 28 for kneading bolts 24 in the left section 34 and in the right section 34'' of the upper housing half 14, two rows, namely the upper row 29 and the lower row 29''', are equipped with kneading bolts 24, whereas the middle row 29' is not equipped with kneading bolts 24. In contrast to this, of the three rows 29, 29', 29'' of receptacles 28 for kneading bolts 24 in the centre section 34' of the upper housing half 14, one row, namely the centre row 29', is equipped with kneading bolts 24, whereas the upper row 29 and the lower row 29'' are not equipped with kneading bolts 24. Also in the middle section 34' of the lower housing half 14', only the middle row is equipped with kneading bolts such that the middle section 34' of the housing 10 has a total of two rows of opposing kneading bolts 24, i.e., the angle between the two rows of kneading bolts 24 on the inner peripheral surface of the housing 10 is 180°. The raw material to be mixed is added to the mixing and kneading machine 100 by means of the feed hopper 36, then guided through the process sections 34, 34', 34'', and finally discharged through the outlet opening 38. Instead of the depicted process sections 34, 34', 34'', the mixing and kneading machine 100 according to the invention can also have more process sections, for example particularly four process sections, or fewer process sections, for example two or one process section.

According to the invention, the worm shaft 12 for a mixing and kneading machine according to the present invention is designed such that the blade elements 22 on the circumferential surface of the shaft bar 20, are arranged at least in a section extending in the axial direction of the worm shaft 12, as is the middle process section 34' shown in FIG. 1b, in two rows extending in the axial direction of the worm shaft 12, i.e., the worm shaft 12 is designed in some sections to be two-bladed.

Figure 2A:
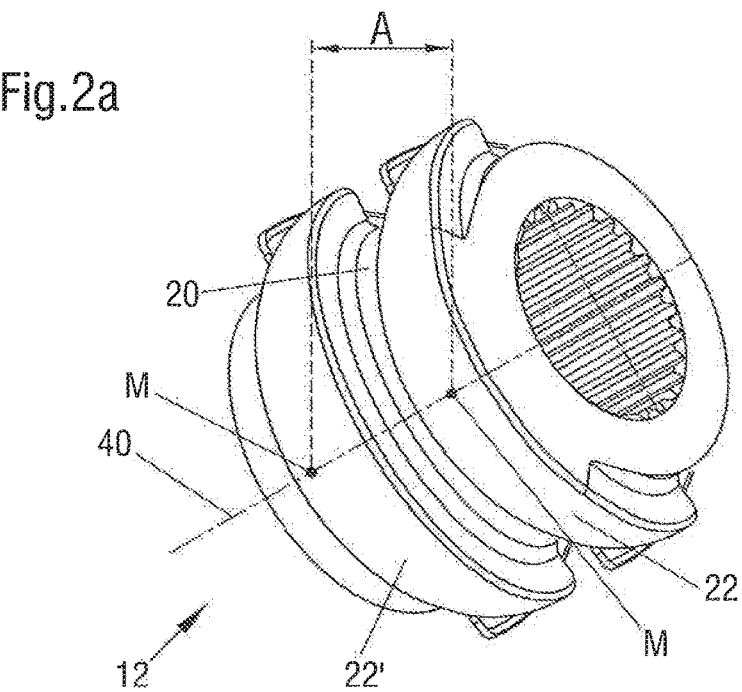
FIG. 2a shows a perspective view of an axial section of a worm shaft according to an embodiment of the present invention.
Figure 2B:
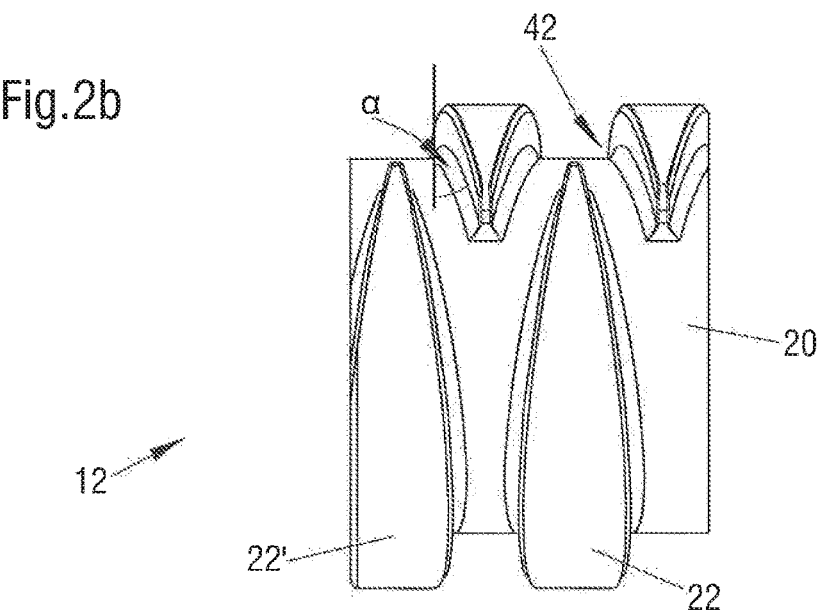
Figure 2C:
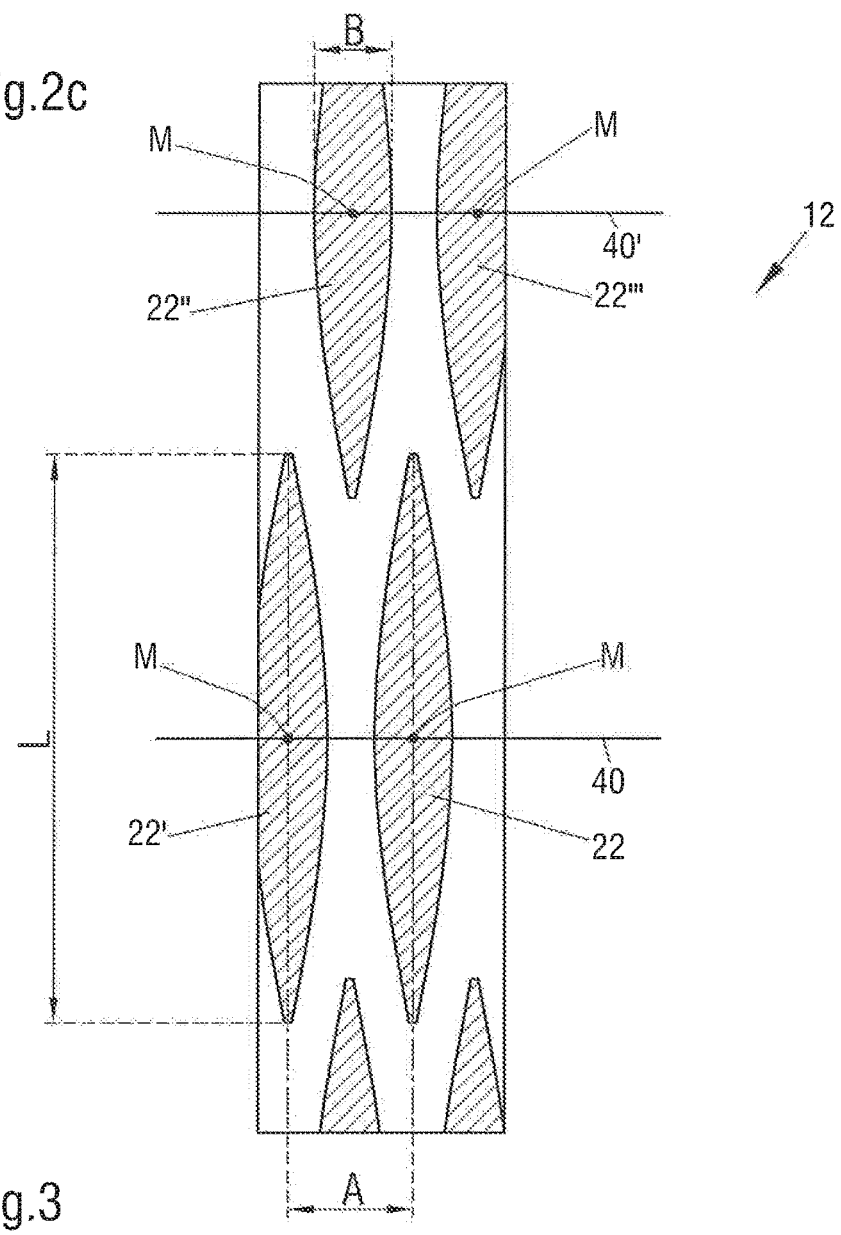
FIG. 2c shows the flat projection of the shell surface of the shaft bar of the axial section of the worm shaft shown in FIG. 2a with the blade elements disposed thereon.

FIGS. 2a through 2c show such a two-bladed section of a worm shaft 12 according to a preferred embodiment of the present invention. On the cylindrical shaft bar 20 of the worm shaft 12 are arranged blade elements 22, 22', 22'', 22''' extending radially outwards from the circumferential surface of the shaft bar 20. Thus, the individual blade elements 22, 22', 22'', 22''' are designed such that, in the top view, they have biconvex outer peripheral surfaces, wherein the longitudinal extensions L of the blade elements 22, 22', 22'', 22''' extend perpendicularly to the longitudinal extension of the worm shaft 12. Longitudinal extension L is understood to mean the longest possible straight line between two different points on the outer peripheral surface of a blade element 22, 22', 22'', 22''', i.e., the length L in this case. All blade elements 22, 22', 22'', 22''' have the same form and the same dimensions. The ratio of the length L to the width B of the individual blade elements 22, 22', 22'', 22''' is about 7.25, wherein the width B is the longest straight extension of the outer peripheral surface of the blade element 22, 22', 22", 22''', which extends perpendicularly to the length L of the blade element 22, 22', 22", 22'''. As can be seen particularly from FIGS. 2*a* and 2*b*, the lateral flanks 42 of the blade elements 22, 22', 22", 22''' do not extend from the circumferential surface of the shaft bar 20 to the outer peripheral surface of the blade elements 22, 22', 22", 22''' perpendicularly, but rather at an angle α of 2°. Neighbouring blade elements 22, 22', 22", 22''' are arranged to be spaced apart from one another both in the circumferential direction of the shaft bar 20 and in the axial direction.

Thereby, both the axially spaced apart blade elements 22, 22' are arranged in an axially extending row 40, and the axially spaced apart blade elements 22", 22''' are arranged in an axially extending row 40'. According to the present invention, an axially extending row 40, 40' of blade elements 22, 22', 22", 22''' exists if—as in the embodiment shown in FIGS. 2*a*, 2*b*, and 2*c*—a connecting line positioned over the centre points M of the outer peripheral surface of blade elements 22, 22' or 22", 22''' being arranged to be spaced apart from one another in the axial direction is a straight line. The centre point M of a blade element 22, 22', 22", 22''' is thus the point which is located in the middle of the length L of the blade element 22, 22', 22", 22'''. The individual blade elements 22, 22' of the row 40 are located opposite the blade elements 22", 22''' of the row 40' on the circumferential surface of the shaft bar 20—as seen in the cross-section of the shaft bar 20—, i.e., the centre points M of the outer peripheral surface of the blade elements 22, 22', 22", 22''' of both rows 40, 40' are displaced from one another by 180° on the circumferential surface of the shaft bar. The ratio of the axial distance A of the neighbouring blade elements 22, 22' of the row 40 and the neighbouring blade elements 22", 22''' of the row 40' to the width B of the blade elements 22, 22' is respectively about 1.5. The width B of the blade element is thereby defined as above and the axial distance A of two axially neighbouring blade elements 22, 22' or 22", 22''' is the distance between the centre points M of the outer peripheral surfaces of the axially neighbouring blade elements 22, 22' or 22", 22'''.

All lengths L of the blade elements 22, 22', 22", 22''' extend respectively over the same angular section of 195° over the (outer) circumferential surface or shell surface of the shaft bar 20. Because these angles are more than 180°, the ends of the neighbouring blade elements 20, 20''' or 20', 20" in the circumferential direction of the shaft bar 20 overlap in some parts. For this reason, the blade elements 20, 20''' or 20', 20" as seen in the cross-section of the shaft bar 20 being neighbouring in the circumferential direction of the shaft bar 20 are slightly displaced with respect to one another in the axial direction, and such that the two ends of the blade elements being positioned in the circumferential direction of the shaft bar 20 are axially offset by about 60% of the width B of a blade element 22, 22', 22", 22''', such that areas of these two blade elements, such as the right third of the one blade element 22 and the left third of the other blade element 22''', overlap, as seen in the circumferential direction of the shaft bar 20 of the shaft bar. Through this comparatively long extension of the blade elements 22, 22', 22", 22''' and the resulting partial overlapping of the blade elements 22, 22', 22", 22''', not only is an excellent conveying capacity achieved in relation to the quantity of conveyed mixture in the conveying direction—per time unit and in relation to the worm shaft diameter—but also a backflow of part of the mixture being conveyed against the conveying direction is particularly reliably avoided or at least drastically reduced. Thereby, in the interior 18 of the housing 20 in which the worm shaft 12 is arranged, a suitable plasticisation is set up such that retaining rings can be omitted on the inner peripheral surface of the housing 10, as is necessary in the prior art, without any undesirable deposits gathering on the worm shaft 12.

Figure 3:
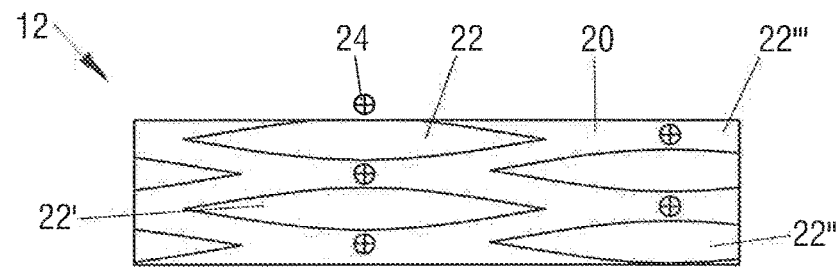
FIG. 3 shows the flat projection of the shell surface of the shaft bar of an axial section of a worm shaft with the blade elements disposed thereon and kneading elements protruding into a gap between the blade elements according to another embodiment of the present invention.

FIG. 3 shows the flat projection of the shell surface of the shaft bar 20 of an axial section of a worm shaft 12 with the blade elements 22, 22', 22", 22''' disposed thereon and kneading elements 24 protruding into a gap between the blade elements 22, 22', 22", 22''' according to another embodiment of the present invention. When operating the mixing and kneading machine, the worm shaft 12 rotates and the worm shaft 12 moves at the same time back and forth in a translatory movement once per revolution. The lateral flanks 42 of the blade elements 22, 22', 22", 22''' thereby move along the kneading elements 24.

Figure 4:
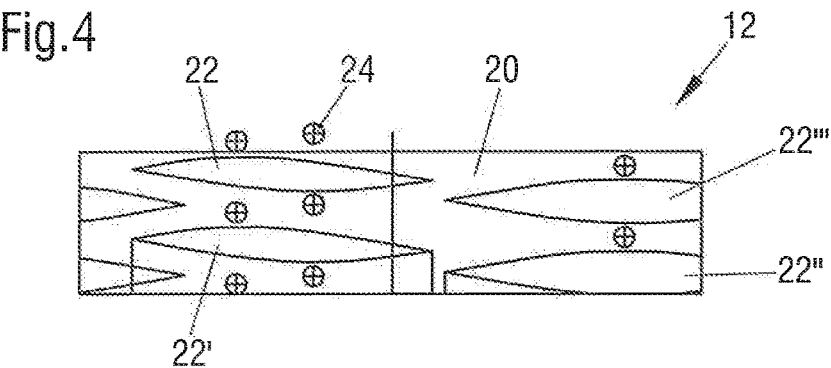
FIG. 4 shows the flat projection of the shell surface of the shaft bar of an axial section of a worm shaft with the blade elements disposed thereon and kneading elements protruding into a gap between the blade elements according to another embodiment of the present invention.
Figure 5:
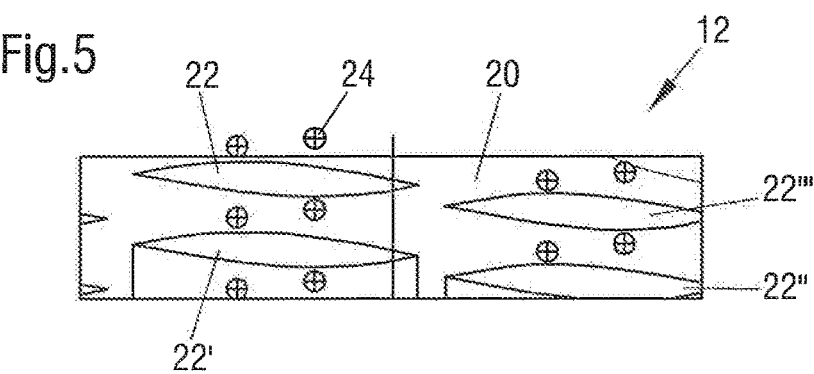
FIG. 5 shows the flat projection of the shell surface of the shaft bar of an axial section of a worm shaft with the blade elements disposed thereon and kneading elements protruding into a gap between the blade elements according to another embodiment of the present invention; and, FIG. 6 shows the flat projection of the shell surface of the shaft bar of an axial section of a worm shaft with the blade elements disposed thereon and kneading elements protruding into a gap between the blade elements according to another embodiment of the present invention.
Figure 6:
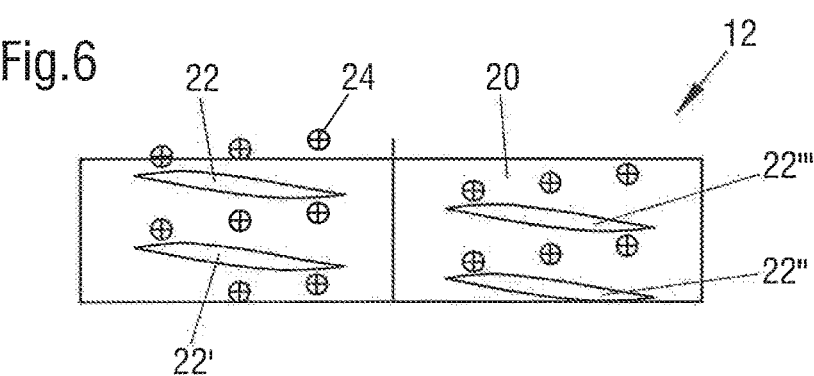

FIGS. 4 to 6 show alternative embodiments to that in FIG. 3. With the embodiment shown in FIG. 4, the angular section over the blade elements 22, 22', 22", 22''' is less than in the embodiment of FIG. 3. In addition, the housing inner peripheral surface in this embodiment comprises three rows of kneading bolts 24. With the embodiment shown in FIG. 5, the housing inner peripheral surface comprises 4 rows of kneading bolts 24, and 6 rows of kneading bolts 24 are in the embodiment shown in FIG. 6. In addition, the blade elements 22, 22', 22", 22''' shown in FIGS. 5 and 6 have a different geometry to that shown in FIGS. 3 and 4.

LIST OF REFERENCE SYMBOLS

10 Housing
12 Worm shaft
14, 14' Housing half
16 Housing shell
18 Hollow interior
20 Shaft bar
22, 22', 22", 22''' Blade element
24 Kneading element/kneading bolt
28 Receptacle/bore for kneading element
29, 29', 29" (Axially extending) row of receptacles for kneading elements
34, 34', 34" Process section
36 Feed hopper
38 Outlet opening
40, 40' (Axially extending) row of blade elements
42 Lateral flank of a blade element
100 Mixing and kneading machine
α Angle between the circumferential surface of the shaft bar and the lateral flank of a blade element
A Axial distance A of two neighbouring blade elements of one row
B Width (longest straight extension of the outer peripheral surface of the blade element, which extends perpendicularly to the length of the blade element)
L Length (longest straight extension of the outer peripheral
M Centre point of the outer peripheral surface of a blade element

What is claimed is:

1. A worm shaft (12) for a mixing and kneading machine (100) having a shaft bar (20) having a circular cross-section, on the circumferential surface of which blade elements (22, 22', 22", 22''') extending outwards from the circumferential surface of the shaft bar (20) are arranged to be spaced apart from one another, wherein the blade elements (22, 22', 22", 22''') are arranged on the circumferential surface of the shaft bar (20), at least in one section extending in the axial direction of the worm shaft (12), in two rows (40, 40') extending in the axial direction of the worm shaft (12), wherein this section extending in the axial direction of the worm shaft (12) does not comprise any further blade elements except those arranged in the two rows, wherein the section of the worm shaft (12) extending in the axial direction in which each of the blade elements (22, 22', 22", 22''') has the aforementioned form of outer peripheral surface is at least 0.2 D of the length of the worm shaft (12), wherein D is the diameter of the worm shaft (12), and further wherein each of the blade elements (22, 22', 22", 22''') of the at least one section extending in the axial direction of the worm shaft (12)—as seen in the cross-section of the shaft bar (20)—extends over an angular distance of at least 180°.

2. The worm shaft (12) according to claim 1, characterised in that the blade elements (22, 22', 22", 22''') extend radially outwards from the circumferential surface of the shaft bar (20).

3. The worm shaft (12) according to claim 1 characterised in that the blade elements (22, 22', 22", 22''') of the two rows (40, 40') are positioned opposite one another on the circumferential surface of the shaft bar (20)—as seen in the cross-section of the shaft bar (20).

4. The worm shaft (12) according to claim 1, characterised in that each of the blade elements (22, 22', 22", 22''') of the at least one section extending in the axial direction of the worm shaft (12) has a longitudinal extension L, which extends at an angle of 45° to 135 to the axial direction of the worm shaft (12).

5. The worm shaft (12) according to claim 1, characterised in that each of the blade elements (22, 22', 22", 22''') of the at least one section extending in the axial direction of the worm shaft (12) has an elliptic, oval, or biconvex outer peripheral surface in the top view.

6. The worm shaft (12) according to claim 5, characterised in that each of the blade elements (22, 22', 22", 22''') has the same elliptical, oval, or biconvex outer peripheral surface.

7. The worm shaft (12) according to claim 5, characterised in that each of the blade elements (22, 22', 22", 22''') has a biconvex outer peripheral surface with a ratio of length L to width B of 3 to 11, wherein the length L is the longest straight extension of the outer peripheral surface of the blade element (22, 22', 22", 22''') and the width B is the longest straight extension of the outer peripheral surface of the blade element (22, 22', 22", 22'''), which extends perpendicularly to the length L of the blade element (22, 22', 22", 22''').

8. The worm shaft (12) according to claim 5, characterised in that the lateral flanks (42) of each of the blade elements (22, 22', 22", 22''') extend perpendicularly upwards from the circumferential direction of the shaft bar (20) to the outer peripheral surface (22, 22', 22", 22''') of the blade elements (22, 22', 22", 22'''), or at an angle α of 1° to 60 in relation to the cross-sectional plane of the shaft bar (20).

9. The worm shaft (12) according to claim 1, characterised in that the ratio of the axial distance A of two neighbouring blade elements (22, 22', 22", 22''') of a row (40, 40') to the width B of a blade element (22, 22', 22", 22''') is 0.5 to 5, wherein the width B is the longest straight extension of the outer peripheral surface of the blade element (22, 22', 22", 22'''), which extends perpendicularly to the length L of the blade element (22, 22', 22", 22'''), and the axial distance A of two axially neighbouring blade elements (22, 22', 22", 22''') is the distance between the centre points M of the outer peripheral surfaces of the neighbouring blade elements (22, 22', 22", 22'''), wherein the centre point M of a blade element (22, 22', 22", 22''') is the point which is located in the middle of the longest straight extension L of the outer peripheral surface of the blade element (22, 22', 22", 22''').

10. The worm shaft (12) according to claim 1, characterised in that each of the blade elements (22, 22', 22", 22''') of the at least one section extending in the axial direction of the worm shaft (12)—as seen in the cross-section of the shaft bar (20)—extends over an angular distance of at least 160° of the circumferential surface of the shaft bar (20).

11. The worm shaft (12) according to claim 1, characterised in that each of the blade elements (22, 22', 22", 22''') of the at least one section extending in the axial direction of the worm shaft (12)—as seen in the cross-section of the shaft bar (20)—extends over an angular distance of 20° to 160°, wherein the section of the worm shaft (12) extending in the axial direction in which each of the blade elements (22, 22', 22", 22''') extends over the aforementioned angular distance of the circumferential surface of the shaft bar (20), is at least 0.5 D of the length of the worm shaft (12).

12. The worm shaft (12) according to claim 1, characterised in that each of the blade elements (22, 22', 22", 22''') of the at least one section extending in the axial direction of the worm shaft (12)—as seen in the cross-section of the shaft bar (20)—extends over the same angular distance of the circumferential surface of the shaft bar (20).

13. A housing (10) of a mixing and kneading machine (100) for continual processing, wherein in the housing (10) a hollow interior (18) is designed in which at least in some sections extend in the axial direction of a worm shaft (12) according to claim 1, and wherein is provided in the housing (10) a number of kneading elements (24) which extend to the inner peripheral surface of the housing (10) in the hollow interior (18) of the housing (10), wherein the kneading elements (24) are arranged in at least two rows extending in the axial direction over at least one section of the inner peripheral surface of the housing (10).

14. The mixing and kneading machine (100) for continual processing, such as for the production of polymer granulate, polymer extrusion profiles, or polymer moulded parts, comprising a housing according to claim 13.

15. A section for a worm shaft (12) having a shaft bar (20) with a circular cross-section, wherein on the circumferential surface of the shaft bar (20), blade elements (22, 22', 22", 22''') extending outwards from the circumferential surface of the shaft bar (20) are arranged to be spaced apart from one another, wherein the blade elements (22, 22', 22", 22''') are arranged on the shaft bar (20) in two rows (40, 40') extending in the axial direction of the worm shaft (12) over at least one section of the circumferential surface of the shaft bar (20), wherein this section extending in the axial direction of the worm shaft (12) does not comprise any further blade elements except those arranged in the two rows, wherein the section of the worm shaft (12) extending in the axial direction in which each of the blade elements (22, 22', 22", 22''') has the aforementioned form of outer peripheral surface is at least 0.2 D of the length of the worm shaft (12), wherein D is the diameter of the worm shaft (12), and wherein each row (40, 40') comprises one, two, three, or four blade elements (22, 22', 22", 22''') arranged to be axially spaced apart from one another, and further wherein each of the blade elements (22, 22', 22", 22''') of the at least one section extending in the axial direction of the worm shaft (12)—as seen in the cross-section of the shaft bar (20)—extends over an angular distance of at least 180°.

* * * * *